United States Patent
Arslan et al.

(10) Patent No.: US 10,570,042 B2
(45) Date of Patent: Feb. 25, 2020

(54) VACUUM ENHANCED OPERATION METHOD FOR FORWARD OSMOSIS MEMBRANE BIOREACTORS

(71) Applicant: ISTANBUL TEKNIK ÜNIVERSITESI, Istanbul (TR)

(72) Inventors: Serkan Arslan, Kocaeli (TR); Ismail Koyuncu, Istanbul (TR); Murat Eyvaz, Kocaeli (TR); Derya Imer, Istanbul (TR); Taha Aslan, Istanbul (TR); Ebubekir Yuksel, Kocaeli (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 0 days.

(21) Appl. No.: 16/341,434

(22) PCT Filed: Oct. 26, 2017

(86) PCT No.: PCT/TR2017/050524
§ 371 (c)(1),
(2) Date: Apr. 11, 2019

(87) PCT Pub. No.: WO2018/199859
PCT Pub. Date: Nov. 1, 2018

(65) Prior Publication Data
US 2019/0263693 A1     Aug. 29, 2019

(30) Foreign Application Priority Data
Oct. 26, 2016 (TR) ................ a 2016/15208

(51) Int. Cl.
*C02F 3/12* (2006.01)
*B01D 61/00* (2006.01)
(Continued)

(52) U.S. Cl.
CPC ............ *C02F 3/1268* (2013.01); *B01D 61/00* (2013.01); *B01D 63/00* (2013.01); *C02F 1/444* (2013.01);
(Continued)

(58) Field of Classification Search
CPC ........ C02F 3/1268; C02F 3/1273; C02F 3/20; C02F 1/444; C02F 1/445; C02F 1/441; B01D 63/00; B01D 61/00; B01D 61/005
(Continued)

(56) References Cited

U.S. PATENT DOCUMENTS

2003/0075504 A1*  4/2003  Zha ................. B01D 63/02
                                                                          210/636
2011/0168611 A1*  7/2011  Early .................. C02F 3/06
                                                                          210/104
(Continued)

FOREIGN PATENT DOCUMENTS

CN         103771656 A      5/2014
TR         2015/14718       11/2015
(Continued)

OTHER PUBLICATIONS

Andrea Achilli et al., The forward osmosis membrane bioreactor: A low fouling alternative to MBR processes, ScienceDirect, Apr. 2009, vol. 239, issues 1-3.

*Primary Examiner* — Fred Prince
(74) *Attorney, Agent, or Firm* — Bayramoglu Law Offices LLC

(57) ABSTRACT

A method of operating osmotic membrane bioreactors (OMBRs) includes the steps of feeding the synthetic wastewater from wastewater tank to the reactor with the help of wastewater pump, and transferring of diluted draw solution through TuNFO membrane to the draw solution tank. The draw solution is diluted through passing of high flux water from the reactor into the membrane by means of osmotic force and vacuum force obtained by operating the vacuum pump at higher velocity than the force pump.

2 Claims, 1 Drawing Sheet

(51) Int. Cl.
   *B01D 63/00* (2006.01)
   *C02F 1/44* (2006.01)
   *C02F 3/20* (2006.01)

(52) U.S. Cl.
   CPC .............. *C02F 3/1273* (2013.01); *C02F 3/20* (2013.01); *C02F 1/441* (2013.01); *C02F 1/445* (2013.01)

(58) Field of Classification Search
   USPC ................................ 210/615, 631, 645, 652
   See application file for complete search history.

(56) References Cited

U.S. PATENT DOCUMENTS

| | | |
|---|---|---|
| 2012/0037566 A1 | 2/2012 | Achilli et al. |
| 2013/0001162 A1 | 1/2013 | Yangali-Quintanilla et al. |
| 2015/0360983 A1 | 12/2015 | Murkute et al. |
| 2017/0253510 A1* | 9/2017 | Liao ........................ C02F 1/444 |
| 2018/0093908 A1* | 4/2018 | Chidambaran ........... C02F 3/08 |

FOREIGN PATENT DOCUMENTS

| | | |
|---|---|---|
| WO | 2007147013 A1 | 12/2007 |
| WO | 2014110429 A1 | 7/2014 |

* cited by examiner

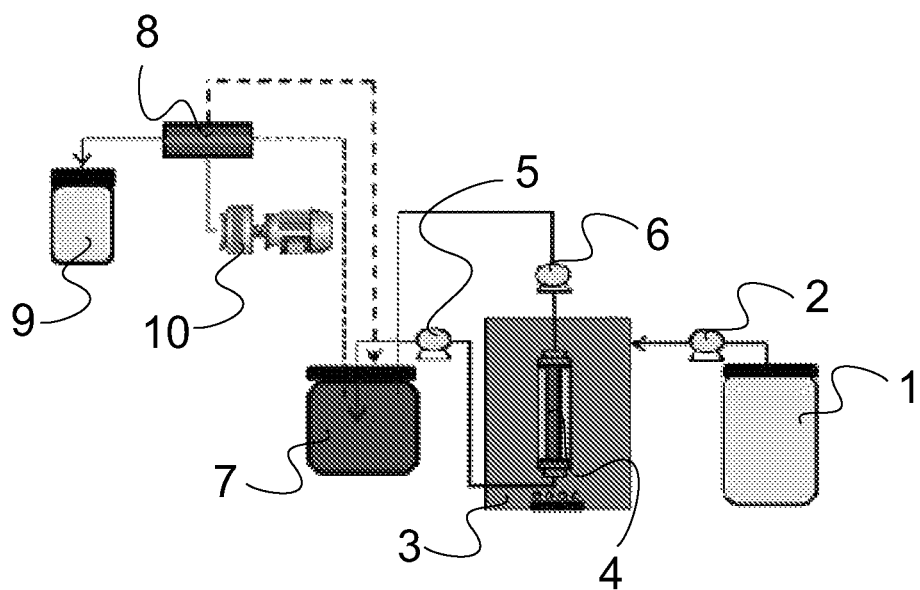

VACUUM ENHANCED OPERATION METHOD FOR FORWARD OSMOSIS MEMBRANE BIOREACTORS

CROSS REFERENCE TO THE RELATED APPLICATIONS

This application is the national phase entry of International Application No. PCT/TR2017/050524, filed on Oct. 26, 2017, which is based upon and claims priority to Turkish Patent Application No. 2016/15208, filed on Oct. 26, 2016, the entire contents of which are incorporated herein by reference.

TECHNICAL FIELD

This invention is related to an operation method which provides supporting the filtered water by osmotic membrane bioreactors (MBR) with vacuum pressure.

In more special context, it is related with a method which includes the circulation of draw solution through the TuNFO membrane operated in membrane bioreactors like osmotic membrane bioreactors and application of vacuum pressure to the membrane in adjustable ratios like pressure driven membrane bioreactors, at the same time.

BACKGROUND

Membrane bioreactors are among the methods used for wastewater treatment nowadays. Because, the biomass concentration per unit area is high in those systems, different designs can be realized to decrease the pollutants such as nitrogen, phosphorus, bacteria and solid materials.

One of these designs is the pressure driven MBRs. The membrane including small pores is submerged into a tank filled with wastewater/sludge mixture and the permeate is separated from the wastewater/sludge mixture with the help of vacuum pressure applied to the system. The clogging of pores of membrane with time means that filtration of water will be more difficult. Therefore, filtration of water from wastewater/sludge mixture is no more possible without applying higher pressures.

Another solution offered to this problem is the osmotic membrane bioreactors (OMBRs) which do not require applying of pressure. In this method, more concentrated draw solution is circulated through the osmotic membrane which is found in a tank filled with wastewater/sludge mixture. The filtration part of treatment system is realized with the diffusion of water molecules into the membrane side with help of concentration difference. On the other hand, it has been seen that there are some problems by the operation of OMBRs such as low flux and concentration polarization.

Just because of these problems of decrease of treatment efficiency and operational difficulties, some solution offers have been developed.

In the known part of the art, it is mentioned about methods and devices for a recovering system of wastewater in the filed international patent document with application no: US2015360983A1 and date: Oct. 1, 2014 which includes osmotic membrane bioreactor, micropore membrane bioreactor nitrogen filtration system, high osmotic pressure solution and reconcentration processes required for efficient water recovery under low energy use.

In the known part of art, it is mentioned about an efficient recovery system for refinery wastewater in the filed Chinese patent document with application no: CN103771656 and date: Oct. 26, 2012 including sequential bath reactor and osmotic membrane bioreactor.

In the known part of art, it is mentioned about manufacturing of tubular nanofiber membrane via coating nanofiber layer on a hallow braided rope and manufacturing of forward osmosis membrane via coating of thin film composite layer on tubular nanofiber membrane used as support layer, in the filed Turkish patent document with application no: TR201514718 and date: Nov. 23, 2015.

The reason of the low flux which is one of the related problems seen in OMBRs, is the insufficiency of osmotic pressure depended on the membrane structure. Another problem is the salt accumulation in the reactor and the reason of it is the salt flux from the side of draw solution circulated through the membrane into the reactor and also increasing of this salt concentration in the reactor as a result of water flux from the reactor into the membrane. On the other hand, the most important problems by pressure driven membranes are clogging problem and low discharge water quality.

To overcome these problems related with MBRs and OMBRs mentioned above, the need of realization of new operation methods with some solution offers has been appeared.

SUMMARY

The aim of this invention is to realize an operation method for bioreactor by which the draw solution is circulated through the membrane which is the case by osmotic membrane bioreactor and the vacuum pressure is applied to the membrane at the same time.

Another aim of this invention is to prevent the clogging problem seen in pressure driven membrane bioreactors and salt accumulation in reactor seen in OMBRs.

In this invention tubular nanofiber forward osmosis membrane (TuNFO) was used which is manufactured with polyamide thin film coating method of which support layer is nanofibers coated on a hollow braided rope with electrospinning method and the invention was realized with use of vacuum pump located after the membrane which works at higher velocities than the force pump located before the membrane. In this way, the draw solution can be circulated through the membrane and vacuum pressure can be applied to the membrane at the same time.

BRIEF DESCRIPTION OF THE DRAWINGS

The parts of new bioreactor operation method realized to reach to the goals of this invention are presented at the attached figures.

FIG. 1 is a schematic illustration of a bioreactor system by which an operation method of the present invention is realized.

All parts in the drawings are one by one enumerated and the meanings of numbers are given.

1—Wastewater tank
2—Wastewater pump
3—Reactor
4—TuNFO membrane
5—Vacuum pump
6—Force pump
7—Draw solution tank
8—Reverse osmosis system
9—Reverse osmosis permeate tank
10—Reverse osmosis tank

DETAILED DESCRIPTION

The invention subject; bioreactor system includes the following parts;

The 20 liters wastewater tank (1) filled with synthetic wastewater,

Adjustable wastewater pump (2) connected to wastewater tank (1), which takes the wastewater from wastewater tank (1) and transfers to the reactor (3), The plexiglass reactor (3) with 23 liters active volume including the membrane module (4) of TuNFO membranes, The TuNFO membrane (tubular nanofiber forward osmosis membrane) (4) found in the reactor (3) draws the filtered water with high efficiency from wastewater/sludge mixture found in the reactor (3) into the membrane as salt and water mixture with the help of vacuum applied to it, The vacuum pump of which power is adjustable (5) and which vacuums the draw solution from the draw solution tank (7) through the TuNFO membrane (4), The 17 liters draw solution tank (7) which is used to collect the draw solution circulated through the membrane, The force pump (6) which ensures adequate circulation of draw solution through the TuNFO membrane (4), The reverse osmosis permeate tank (9) used for collection of permeate coming from reverse osmosis system (8), The adjustable reverse osmosis pump (10) which takes the draw solution from draw solution tank (7) and pumps to the reverse osmosis system (8).

The invention subject; The bioreactor operation method includes the following steps;

Filling the wastewater tank (1) with synthetic wastewater which represents the high strength commercial wastewater and pumping the synthetic wastewater from wastewater tank (1) if the level of reactor (3) gets down to 39 cm, from the wastewater tank (1) into the reactor (3) till the reactor level increases 41 cm.

Penetrating of water with high fluxes into the draw solution which is circulated through the TuNFO membrane (4) found in reactor (3) from the side of wastewater/sludge found in the reactor (3) with the help of hydrodynamic and osmotic forces as salt and water mixture.

Measuring of the conductivity of draw solution at the points of inlet and outlet of the membrane to determine whether the draw solution is circulated through the TuNFO membrane (4) found in the reactor (3) adequately.

Measuring of reactor (3) conductivity to determine whether a salt leakage occurs from the side of draw solution into the reactor (3).

Against the low flux problem based on the osmotic pressure difference between the draw solution circulated through the TuNFO membrane (4) and wastewater/sludge mixture in the reactor (3), transferring of diluted draw solution which is diluted by water with high flux drawn from the reactor (3) into the to the draw solution tank (7) with the help of vacuum force resulted from the operation of vacuum pump (5) at higher velocities than force pump (6) and supported by the force pump (6) for an adequate circulation of draw solution through the TuNFO membrane (4).

Pumping of draw solution found in draw solution tank (7) to the reverse osmosis system (8) with help of reverse osmosis pump (10).

Converting of draw solution into the clean water by removing of salt and pollutants which comes to the reverse osmosis system (8) and filtered through the reverse osmosis membrane under high pressure and transferring of this clean water to the permeate tank (9).

Recycling of concentrate including salt and other pollutants which are concentrated from draw solution to the draw solution tank (7) and minimizing the waste discharge through using the concentrate as draw solution again.

In the bioreactor which is the related invention subject, the wastewater is pumped from the wastewater tank (1) with wastewater pump (2) into the reactor (3) and salt and water mixture penetrate the TuNFO membrane (4) found in the reactor (3) with the help of hydrodynamic and osmotic forces. To determine whether the water penetrates the TuNFO membrane and the draw solution is circulated adequately, the conductivity of draw solution at the points of inlet and outlet of TuNFO membrane is measured continuously. At the same time, the conductivity in the reactor (3) is measured continuously to control whether there is a leakage from draw solution side into the reactor (3). The draw solution is pumped to the TuNFO membrane (4) with the force pump (6) and vacuumed from the other side of TuNFO membrane (4) with the vacuum pump (5) more powerful than the force pump. In this way, the draw solution is circulated through the membrane and the vacuum pressure is applied to the membrane at the same time and therefore the low flux problem would be eliminated and the clogging problem would be minimized due to the continuous cleaning of membrane with the help of the osmotic forces and circulation of draw solution through the membrane. After that, the diluted draw solution which is transferred from the TuNFO membrane (4) to the draw solution tank (7) with help of vacuum pump (5) and force pump (6), is pumped to the reverse osmosis system (8) with reverse osmosis pump (10) and filtered to the clean water in reverse osmosis process. When the clean water is transferred to the permeate tank (9), the remained concentrate from the reverse osmosis process including salt and other pollutants is recycled to the draw solution tank (7). Thus, the concentrate from reverse osmosis system is used again as draw solution and the waste discharge from entire system is minimized (FIG. 1).

What is claimed is:

1. An operation method of osmotic membrane bioreactors (OMBRs), comprising the following steps:

transferring a diluted draw solution to a draw solution tank, wherein a draw solution is diluted by water to form a diluted draw solution, the draw solution is diluted with water filtered through a tubular nanofiber forward osmosis (TuNFO) membrane from a side of a sludge/wastewater mixture under actions of a hydrodynamic force and an osmotic force maintained through operation of a vacuum pump at a higher velocity than a force pump, and when a water level of a reactor is decreased to a first predetermined level, feeding wastewater from a wastewater tank to the reactor by a wastewater pump till the water level in the reactor is increased up to a second predetermined level.

2. The operation method of the OMBRs of claim 1, wherein after the step of transferring the diluted draw solution to the draw solution tank, the operation method further comprising the following steps:

separating filtered water from a concentrate by sending the draw solution to a reverse osmosis system with a reverse osmosis pump, and using the concentrate as draw solution again through recycling the concentrate to the draw solution tank.

\* \* \* \* \*